(12) United States Patent
Huber et al.

(10) Patent No.: US 6,650,326 B1
(45) Date of Patent: Nov. 18, 2003

(54) METHOD OF HANDLING CONTEXT DURING SCALING WITH A MAP DISPLAY

(75) Inventors: Mark Huber, Hoffman Estates, IL (US); Philip Robare, Chicago, IL (US)

(73) Assignee: Navigation Technologies Corp., Chicago, IL (US)

( * ) Notice: Subject to any disclaimer, the term of this patent is extended or adjusted under 35 U.S.C. 154(b) by 314 days.

(21) Appl. No.: 09/767,054

(22) Filed: Jan. 22, 2001

(51) Int. Cl.$^7$ .............................................. G06T 15/00
(52) U.S. Cl. ..................................................... 345/428
(58) Field of Search ................................ 345/419, 428, 345/582, 587, 629–631, 637, 639, 640, 660, 661, 667–669, 794–797, 800, 804, 805; 701/207, 208, 212

(56) References Cited

U.S. PATENT DOCUMENTS

| | | | |
|---|---|---|---|
| 6,006,161 A | 12/1999 | Katou | 701/212 |
| 6,112,200 A | 8/2000 | Livshutz et al. | 707/4 |
| 6,175,801 B1 | 1/2001 | Millington | 701/207 |
| 6,178,380 B1 | 1/2001 | Millington | 701/212 |
| 6,222,555 B1 * | 4/2001 | Christofferson et al. | 345/428 |
| 6,373,482 B1 * | 4/2002 | Migdel et al. | 345/419 |
| 6,397,143 B1 | 5/2002 | Peschke | 701/208 |
| 2002/0042674 A1 | 4/2002 | Mochizuki et al. | 701/211 |

OTHER PUBLICATIONS

U.S. patent application Ser. No. 09/795,229, filed Feb. 28, 2001 entitled "Method of Providing Visual Continuity when Panning and Zooming with a Map Display".

* cited by examiner

Primary Examiner—Almis R. Jankus
(74) Attorney, Agent, or Firm—Jon D. Shutter; Frank J. Kozak; Lawrence M. Kaplan (57) ABSTRACT

A method for displaying a zooming operation on a display screen of a computing platform. The method includes retrieving data from a geographic data storage system, possibly located on another system, displaying a starting image that shows geographic features at a first scale with a first level of detail and then displaying an ending image that shows the same geographic features at a second scale with a second level of detail. Between the displaying of the starting image and the displaying of the ending image, at least one intermediate image is displayed. The intermediate image combines two component images of at least some of the same geographic features shown in the starting or ending image. The two component images in the intermediate image are at the same scale and are registered with respect to each other so that the same geographic features represented in the two component images coincide. One of the two component images in the intermediate image includes at least a portion of the starting image and is formed using data from a first layer of a geographic database. The other of the two component images in the intermediate image is formed using data from a second layer of the geographic database.

24 Claims, 4 Drawing Sheets

FIG. 3
Layer 0 Only

FIG. 4 Layer 1 with Layer 0 grayed

FIG. 5
Layer 1 with Layer 0 even more grayed

FIG. 6
Layer 2 with Layer 1 grayed. Layer 3 starting to come in

FIG. 7
Layer 3, Layer 2 fading out

FIG. 8
Layer 3 only

FIG. 9

METHOD OF HANDLING CONTEXT DURING SCALING WITH A MAP DISPLAY

BACKGROUND OF THE INVENTION

The present invention relates to the presentation of map information on a display screen of a computing device, and more particularly, the present invention relates to a way to improve the presentation of map information on a display screen of a computing device when a user zooms in or out.

There are various computing platforms that graphically display maps of geographic areas. For example, some in-vehicle navigation systems include a display screen upon which a map of a geographic area can be displayed graphically. In addition, by using appropriate software applications, maps can also be displayed on general purpose computing platforms, such as personal computers and personal digital assistants.

Some computing platforms and applications that display maps graphically include features that allow a user to interact with the map. Various types of user interaction may be supported. Among the features that may be supported is the ability to zoom in or out. When a user zooms in on a map, a sub-portion of the originally displayed map is selected. The user may operate a pointing device for this purpose. Then, a new map is graphically displayed. The new map corresponds to the geographic area of the selected sub-portion of the originally displayed map. The new map is at a larger scale than the originally displayed map so that new map fills the same area on the display screen of the computing device on which the originally displayed map had been shown.

When a user zooms out on a graphically displayed map, the new map is at a smaller scale that the previously displayed map. The new map corresponds to a geographic area that is larger than the geographic area that corresponds to the previously displayed map such that the geographic area that corresponds to the previously displayed map is only a sub-portion of the geographic area that corresponds to the new map.

Maps shown at different scales on display screens may include different levels of detail. This is done in order to make it easier for a user to read and understand the information presented on the map. For example, large-scale maps may include more detail (e.g., all the streets and other cartographic features may be displayed) whereas small-scale maps may include less detail (e.g., secondary streets and minor features may be omitted). If secondary streets and minor features were not omitted on a small-scale map, the display would contain so much information that a user may find it difficult to understand.

Because maps at different scales are associated with different levels of detail, a lower level layer of map information may become visible or disappear when a user is zooming in and out on a map. The sudden appearance or disappearance of an entire level of map information may sometimes be confusing to the user. In addition, geographic features may be represented differently at different levels of detail. For example, on a large scale map (i.e., a map with a high level of detail), a road on which the lanes are separated by a median may be represented by two separate lines—one line representing the lanes on one side of the median and the other line representing the lanes on the other side of the median. However, on a small scale map (i.e., a map with a low level of detail), a road on which the lanes are separated by median may be represented by only a single line. This change in the appearance of represented features that occurs when zooming in and out on a map can also be confusing to a user. For example, if an area or intersection changes shape significantly when the scale is changed, the user may lose his/her point of reference on the map, i.e., he/she may become unsure where on the map it was that he/she was viewing. This can lead to repeated zooms in and then out while the user tries to determine which roads and features remain the same across the transition between levels of detail.

Accordingly, there is a need for an improved way to represent map features when zooming in and out.

SUMMARY OF THE INVENTION

To address these and other objectives, the present invention comprises a method for representing geographic features when a map display is zoomed in or out. The method includes displaying a starting image that shows geographic features at a first scale with a first level of detail and then displaying an ending image that shows the same geographic features at a second scale with a second level of detail. Between the displaying of the starting image and the displaying of the ending image, at least one intermediate image is displayed. The intermediate image combines two component images of at least some of the same geographic features shown in the starting or ending image. The two component images in the intermediate image are at the same scale and are registered with respect to each other so that the same geographic features represented in the two component images coincide. One of the two component images in the intermediate image includes at least a portion of the starting image and is formed using data from a first layer of a geographic database. The other of the two component images in the intermediate image is formed using data from a second layer of the geographic database.

DETAILED DESCRIPTION OF THE PRESENTLY PREFERRED EMBODIMENTS

I. Overview of Computing Platform and Geographic Database

Figure 1:
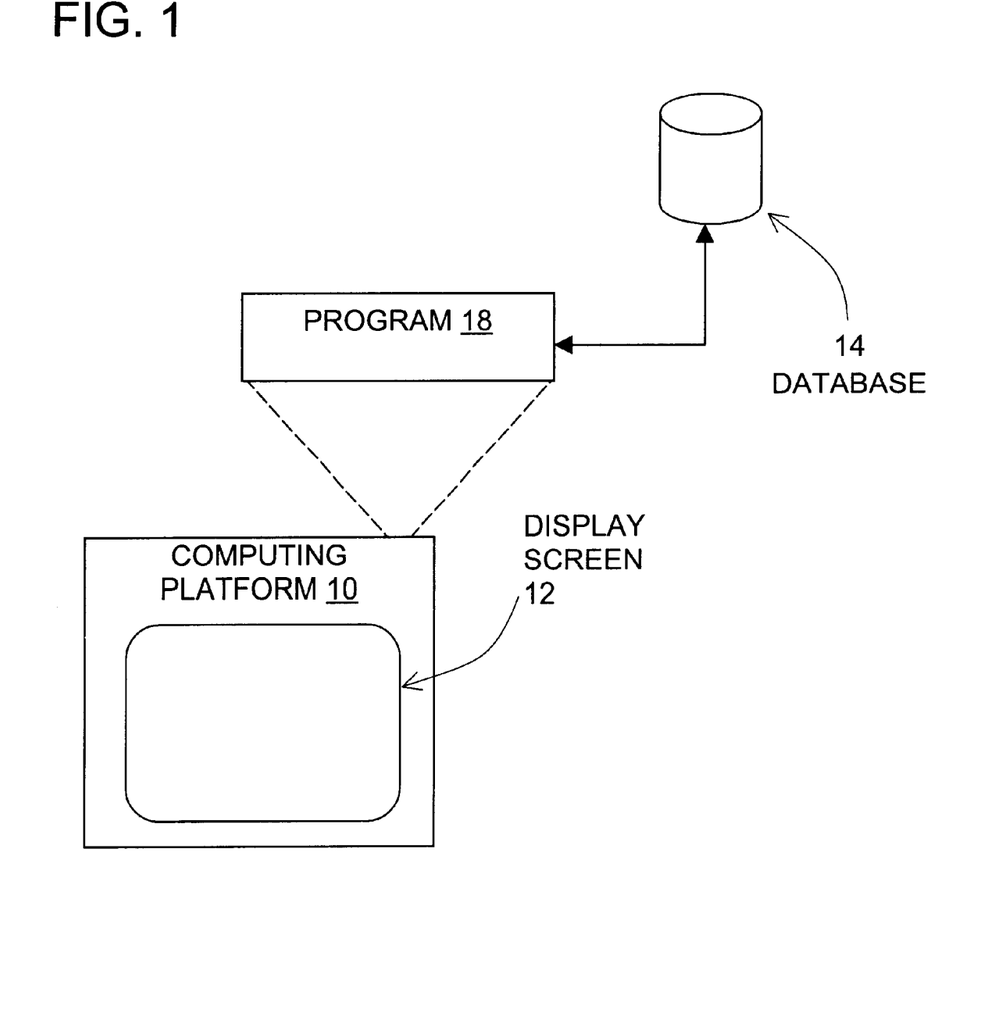
FIG. 1 is a diagram illustrating a computing platform that incorporates an embodiment of a feature for a map display that provides context during scaling.

FIG. 1 shows a computing platform 10. The computing platform 10 may be an in-vehicle navigation system, a personal navigation system, a personal computer, a personal digital assistant, or other device. The computing platform 10 may be part of a network or may be a standalone device.

Associated with the computing platform is a geographic database 14. The geographic database 14 may be located locally with the computing platform 10 or may be located remotely from the computing platform 10. If the geographic database 14 is located remotely from the computing platform 10, the data in the geographic database 14 may be provided to the computing platform 10 via a network or other type of communications system. The network or other type of communications system may be wireless, land-based, or a combination of both wireless and land-based. The network may include the Internet.

The geographic database 14 includes data from which maps can be graphically rendered. Formats for organizing and accessing a geographic database that includes data from which maps can be graphically rendered are disclosed in U.S. Pat. Nos. 5,968,109 and 6,047,280, the disclosures of which are incorporated herein by reference.

Associated with the computing platform 10 is a program 18 that uses data from the geographic database 14 to render maps graphically on a display screen 12 of the computing platform 10. There are various ways to implement a program that uses data from a geographic database to render maps graphically. For example, ways to display maps using data from a geographic database are disclosed in U.S. Pat. Nos. 6,092,076 and 6,163,749, the disclosures of which are incorporated herein by reference.

Figure 2:
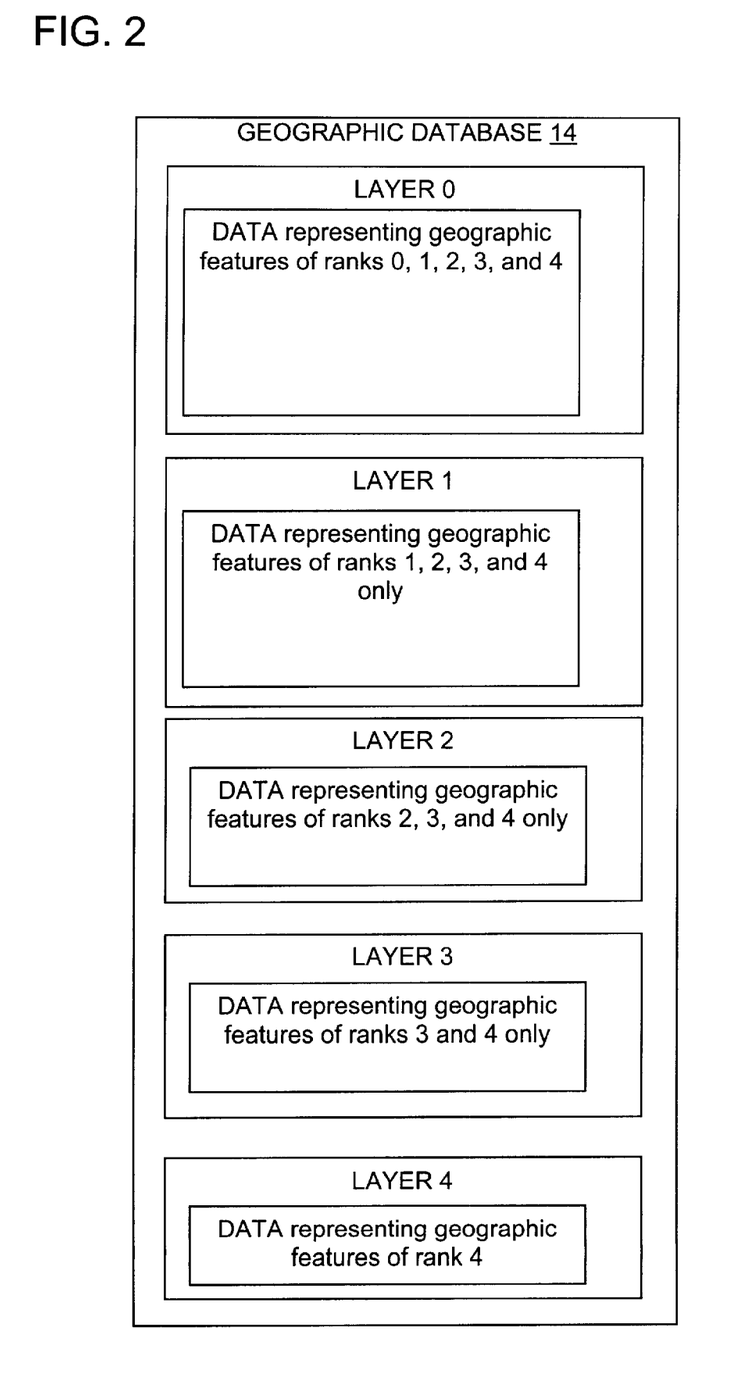
FIG. 2 is a diagram of the database in FIG. 1 and shows an arrangement for organizing the database into layers.

As mentioned above, when displaying maps at different scales, it may be preferred to provide the maps with different levels of detail. In order to facilitate the presentation of maps at different levels of detail, data that represent geographic features may be organized into layers. FIG. 2 is a diagram illustrating an organization of the geographic database 14 into layers. In the embodiment of FIG. 2, the geographic database is organized into layers based on a rank associated with the represented features. The lowest rank (e.g., 0) is associated with those features that are represented only when the finest level of detail is desired. In the case of roads, the lowest rank may be associated with side streets and alleys. On the other hand, the highest rank (e.g., 4) is associated with the most important features, i.e., those that would be displayed even at the coarsest level of detail. In the case of roads, the highest rank may be associated with expressways and major arterial roads.

When data representing geographic features are organized into layers, the lowest layer (e.g., 0) includes data representing geographic features of all ranks (e.g., 0–4). A highest layer (e.g., 4) includes data representing geographic features of only the highest rank (e.g., 4). Each other layer includes only those data that represent those geographic features of the associated rank and higher ranks. For example, layer 2 includes data that represent geographic features having ranks 2, 3 and 4. Layer 2 excludes data that represents geographic features of ranks 0 and 1.

As shown in FIG. 2, these layers can exist as separate collections of the geographic data. When a navigation function, such as map display, requires geographic data with a high level of detail, a lower layer is accessed and used. On the other hand, when a navigation function requires geographic data with a low level of detail, a higher layer is accessed and used.

In an alternative embodiment, layers can be implemented logically with a single collection of the geographic data. The single collection would include all the data of all the ranks, i.e., similar to layer 0 in FIG. 2. When a navigation function requires geographic data with a low level of detail, geographic features having higher ranks are suppressed logically. The logical suppression of higher ranked data is performed using a software program.

II. Context During Scaling Feature

In accordance with a first embodiment, the map display program (e.g., 18 in FIG. 1) implements a feature whereby a user is presented with context information when changing scale, e.g., zooming, with a map being displayed. This context information takes the form of one or more intermediate (or transitional) displays of map information between the original map display (i.e., the map being shown before the user initiates a zooming operation) and the final map display (i.e., the map being shown when the zooming operation is completed). Each intermediate display of map information includes at least portions of two separate layers of map information. The data from these two separate layers of map information are on the screen at the same scale at the same time and overlaid so that the represented features coincide. In at least one of the intermediate displays, the two layers of map information include the layer used for the original map display. The other layer may be the layer used for the final map display, or if there are one or more layers of map information with levels of detail between the level used for the original map display and the level used for the final map display, the other layer included in the intermediate display with the layer used for the original map display may be one of these intermediate layers. By showing an intermediate image that includes both the original map data and data from another layer (either the layer used for the final map display or another layer between the layer used for the original display and the final display), the user is better able to observe the relationship between the original map display and the final map display.

In one embodiment, at least one intermediate image is provided for each transition between adjacent layers when zooming. For example, if a user zooms from a map display formed using data from layer 0 to a map display formed using data from layer 4, there are four intermediate images. A first intermediate image shows at least portions of layer 0 and layer 1 at the same time, a second intermediate image shows portions of layer 1 and layer 2 at the same time, a third intermediate image shows portions of layer 2 and layer 3 at the same time, and a fourth intermediate image shows portions of layer 3 and layer 4 at the same time. In an alternative embodiment, some of these intermediate images may be omitted or combined. For example, an intermediate image may be formed using data from three separate layers at the same time.

Each intermediate image of map information includes component images formed from portions of at least two separate layers of map information. The component images are on the screen at the same scale at the same time and overlaid so that the represented features coincide. In at least one of the intermediate images, the two layers of map information include the layer used for the original map display.

In order to improve presentation of the map information in an intermediate image when data from two separate layers are on the screen at the same time, the data from one of the layers may be presented at a reduced level of color saturation (e.g., a percentage grayscale) or with a level of transparency. For example, if an intermediate image includes data from layer 0 which had been used for the original map display and data from layer 1, the data from layer 1 may be shown at 50% color saturation (e.g., 50% grayscale). If several intermediate images are presented for this transition (i.e., layer 0 to layer 1), each successive intermediate image would show the layer 0 data with lower levels of color saturation (e.g., 100% to 60% to 20%) while the color saturation of the layer 1 data would increase in each successive intermediate image (e.g., 20% to 40% to 60%).

According to another alternative, the intermediate displays may include both decreasing levels of color saturation (or increasing transparency) for the data obtained from one layer and increasing levels of color saturation (or decreasing transparency) for data obtained from the successive layer. Using any of these alternatives, a gradual fading effect can be implemented. According to another alternative, the intermediate images can be more gradual to increase the fading effect.

EXAMPLE

Figure 3:
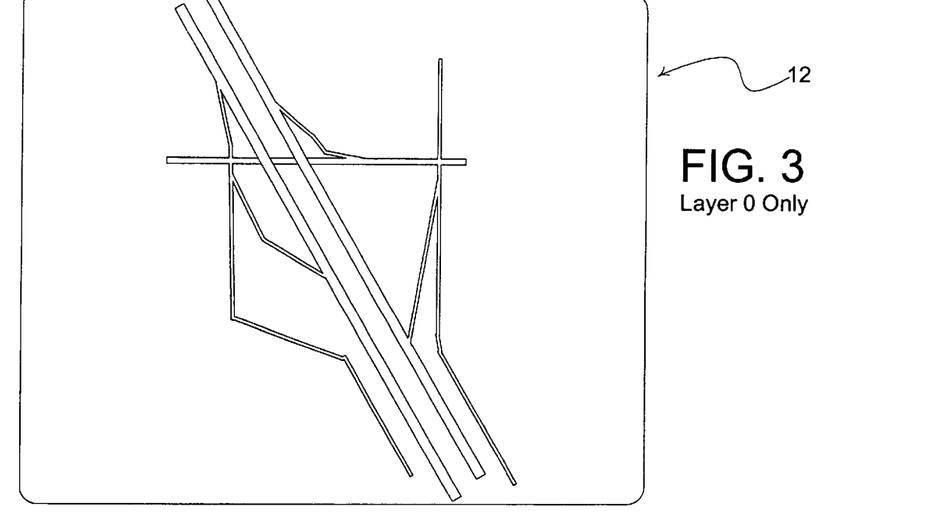
FIG. 3 is an illustration of the display screen of FIG. 1 with a first map image of a geographic feature displayed thereon.

An example of an implementation of an embodiment of the map display feature that provides context during scaling is shown in FIGS. 3–8. FIG. 3 shows an illustration of a geographic feature on the display screen 12 of a computing platform (10 in FIG. 1). The geographic feature is a complex highway interchange. The illustration in FIG. 3 is rendered using data from the geographic database (14 in FIGS. 1 and 2). The data used to form the map display of FIG. 3 is obtained from layer 0 of the geographic database (14 in FIGS. 1 and 2). In the illustration in FIG. 3, there are some rank 0 roads and ramps, a rank 1 road crossing east-west, and a rank 3 double digitized highway. In FIG. 3, the data representing this complex interchange is shown at a scale that is zoomed in far enough to see everything. All the roads are present and fully visible.

When the image of FIG. 3 is being displayed on the display screen 12, the user implements a zooming operation, e.g., zooms out. The user may initiate the zooming operation by manipulating the user interface of the computing platform (10 in FIG. 1). For example, the user may use a pointing device, such as a mouse, to select an area on the display and indicate that zooming out is desired. When the user initiates the zooming operation, the program 18 obtains data from the geographic database 14 that corresponds to the same geographic area, but at a smaller scale.

Figure 4:
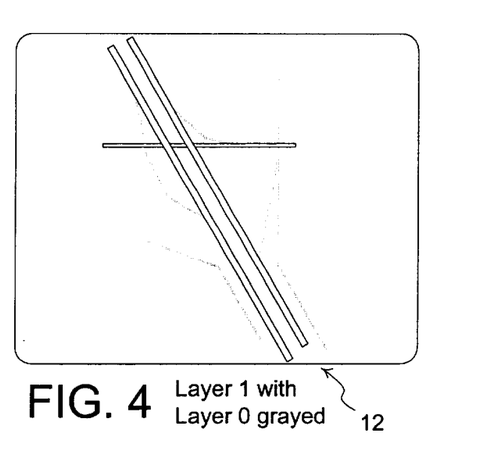
FIG. 4 is an illustration of the display screen of FIG. 1 with an intermediate map image of the same geographic feature as shown in FIG. 3 displayed thereon.
Figure 6:
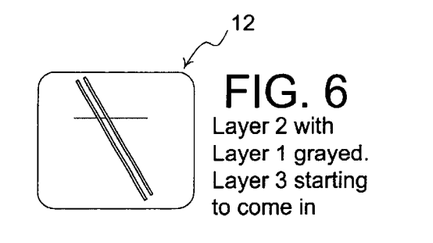
FIG. 6 is another illustration of the display screen of FIG. 1 with yet another intermediate map image of the same geographic feature as shown in FIGS. 3–5 displayed thereon.
Figure 7:
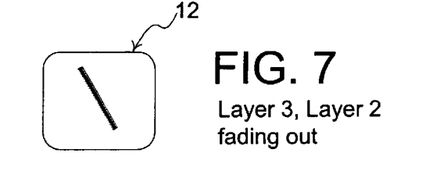
FIG. 7 is another illustration of the display screen of FIG. 1 with still another intermediate map image of the same geographic feature as shown in FIGS. 3–6 displayed thereon.
Figure 8:
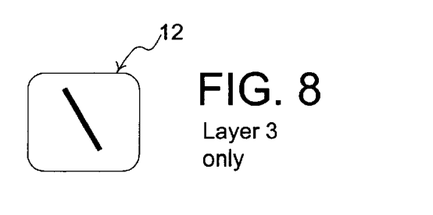
FIG. 8 is an illustration of the display screen of FIG. 1 with a final map image of the same geographic feature as shown in FIGS. 3–7 displayed thereon after zooming out to a desired scale.

FIGS. 4–7 represent successive intermediate map images and FIG. 8 represents the final map display, i.e., the map image at the scale desired by the user when zooming out is fully completed. In FIG. 4, a first intermediate image shows layer 0 and layer 1 data. The layer 0 data and the layer 1 data are on the screen at the same time. The layer 0 data and the layer 1 data are adjusted to the same scale and registered with respect to each other so that the same features represented by each layer coincide (or overlap). The layer 0 data is shown at a 50% color saturation (50% grayscale) and the layer 1 data is shown at full color saturation (100% black).

Figure 5:
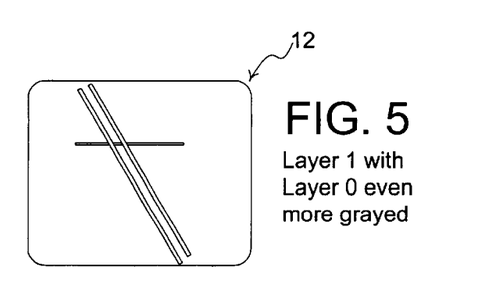
FIG. 5 is another illustration of the display screen of FIG. 1 with another intermediate map image of the same geographic feature as shown in FIGS. 3 and 4 displayed thereon.

FIG. 5 shows a second intermediate image of the same geographic feature (i.e., the intersection). The image in FIG. 5 is displayed after the image of FIG. 4. The image of FIG. 5 is zoomed out even farther from the image in FIG. 4. Layer 0 data is now present only at 20% grayscale.

FIG. 6 shows a third intermediate image of the intersection. The image in FIG. 6 is displayed after the image of FIG. 5. The image of FIG. 6 shows the intersection zoomed out to where layer 2 is the presentation layer at this scale. The only layer 2 information corresponding to this feature is the two lines of the double digitized highway. According to this embodiment, the layer 1 road running east-west is shown in 50% grayscale. This helps the map user retain an idea of where on the highway a point is. The user can relate a location to before or after the overpass. At this scale, the generalized layer 3 version of the highway in gray is beginning to appear. This prepares the map user for the scale at which the two lines representing the highway will turn into a single line.

FIG. 7 shows another intermediate image. In the intermediate image shown in FIG. 7, data from layer 3 shows the highway as a single line. This data from layer 3 is shown at 100% color saturation. The intermediate image shown in FIG. 7 also includes data from layer 2 that shows the highway as a pair of double lines. The data from layer 2 is shown at 50% color saturation and appears in the intermediate image of FIG. 7 as thin gray borders.

FIG. 8 shows the final map display with the image of the geographic feature fully zoomed out to the scale desired by the user. In FIG. 7, the highway is shown as a single thin line with 100% color saturation using only data from layer 3.

III. Alternatives

A. Scalable Vector Graphics (SVG)

Scalable Vector Graphics (SVG) is a proposed standard for web graphics that is being developed by the W3 consortium. SVG envisions a graphics file format with multiple layers of graphics that are developed from polygons, similar to Macromedia Flash or Postscript graphics. Animation is possible with JavaScript code that is part of the graphics file. Transparency of graphics elements are also part of the SVG model. Support for SVG may be included in future browsers, much like support for JPEG and GIF is today.

One of the applications for the SVG format is the display of maps. SVG provides the ability to download maps (as vectors) that can be zoomed and possibly panned without further interaction with the server, at least until more data is needed. Although the SVG format may be helpful for displaying some maps, the SVG format has some limitations. An SVG map with full layer 0 detail for a geographic area, along with context higher level information, would look very cluttered in the detail area when zoomed out. Such a map may also be slow to display. In addition, the display may include detail that is too small to see. These difficulties can be addressed using an embodiment of the disclosed map display feature that provides context during scaling.

Figure 9:
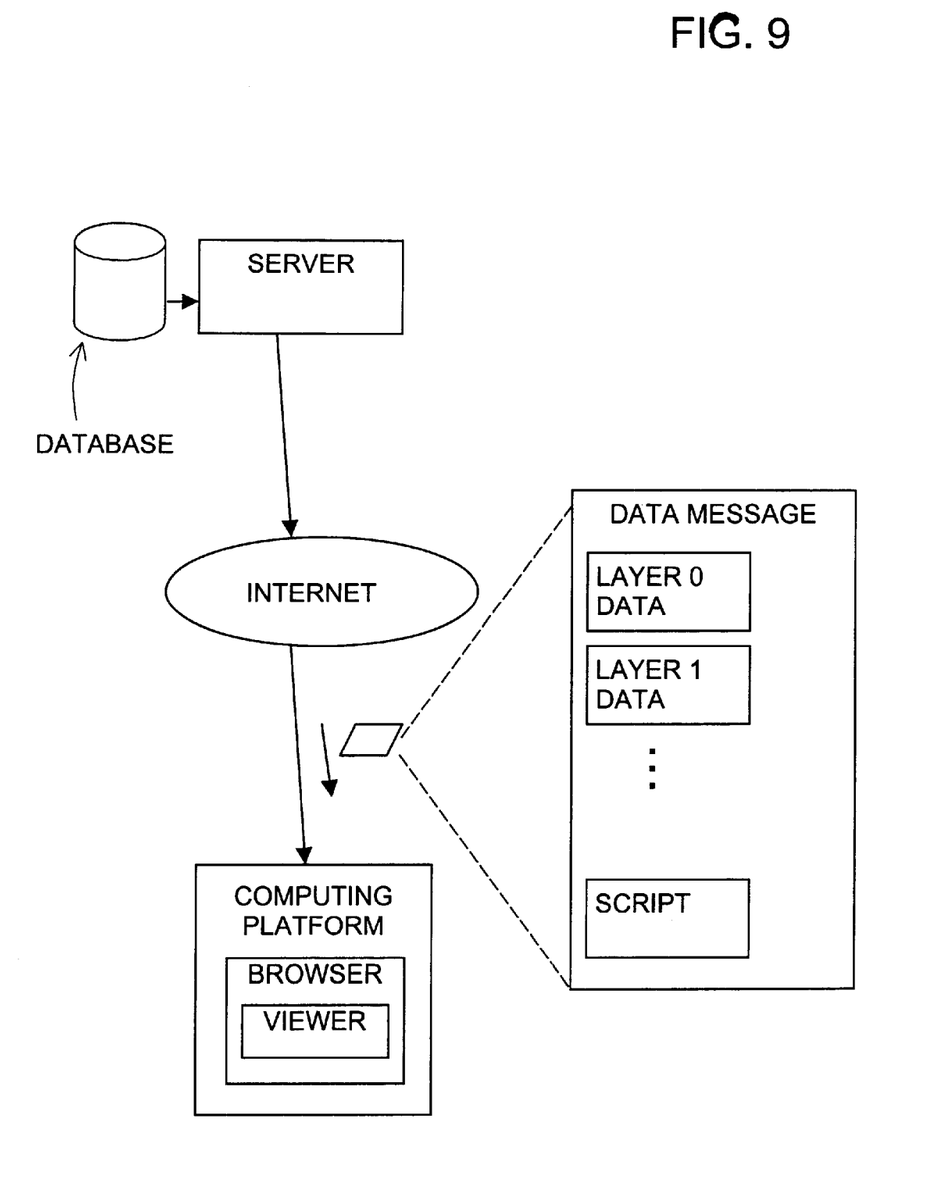
FIG. 9 is a block diagram showing components in an embodiment whereby data for providing context while scaling are downloaded from a server to a client platform.

According to one embodiment, a user operates a client-computing platform to request data from a server for a map of a location. The user may access the server over a network, such as the Internet. The user requests the data in a vector format (such as SVG). The server sends the user a file that contains multiple layers of data. The file would be about four times the size of an SVG map that only showed the data for a single layer at one scale. On the client computing platform, the user uses a viewer capable of viewing smooth scale changes, such as a SVG viewer, to view the downloaded data as a map image. Included with the downloaded file would be a routine or script that could be used in the SVG viewer to adjust layer transparency depending upon zoom layer. The routine or script may be written in JavaScript code, for example. FIG. 9 illustrates components used to implement this embodiment.

According to another embodiment, a user operates a client computing platform to request data from a server for a map of a route. The server sends the user a file that contains multiple layers of data for forming a map for the route. The map for a route includes a nesting set of strip maps centered around the route. Each layer included in the downloaded file would show an area around the route appropriate to the display scale of the layer. As described above, the user uses a viewer, such as an SVG viewer, to view the downloaded data as a map image. The user could zoom in and out of the route, pan along the route and save the downloaded file to transfer to another computer.

Using these embodiments, a user can download a map file that will look attractive at any scale. By using the context during scaling feature, the user may find the map data easier to use and understand when performing a zooming operation.

B. Smooth Zooming Versus Discrete Stages Zooming

As stated above, when a user operates the map display for a zooming operation, the scale of the map changes. The map scale may change in discrete stages or alternatively, the map scale may change gradually, i.e., in stages so small that it appears to the user to be smooth. Embodiments of the context during scaling feature can be used with zooming that occurs in discrete stages or smoothly.

C. Alternative File Formats

It was mentioned above how embodiments of the map display feature that provides context during scaling can be used with vector formats, such as SVG. Embodiments of the map display feature that provides context during scaling can also be used with other file formats, including static formats like JPEG or GIF. If a map is provided in a file format, such as a GIF file format or a JPEG file format, the map can be displayed with an appropriate viewer for such a format. A routine included with the downloaded data would provide for displaying the images over one another with the appropriate transparency.

D. Alternative Colors

In some of the embodiments described above, when data from two different layers are shown at the same time on the display screen, the data from one of the layers is shown at a reduced level of color saturation. In some of the embodiments, this reduced level of color saturation is a shade of gray. However, the display of geographic features is not limited to black or gray. In alternative embodiments, the geographic features can be shown in any color, such as blue, red, etc. Geographic features shown in these colors can be shown with reduced levels of color saturation (or transparency), as appropriate, when shown in intermediate images with any of the above described embodiments.

IV. Advantages

The disclosed embodiments provide several advantages. According to the disclosed embodiments, different layers of data can be scaled to appropriate levels of accuracy on the server. When these data are downloaded to a client platform, the data are displayed only within appropriate ranges of scales. In this way, the data are not displayed with unintelligible detail or large overly heavy lines. Each layer can have its own scaling equation.

It is intended that the foregoing detailed description be regarded as illustrative rather than limiting and that it is understood that the following claims including all equivalents are intended to define the scope of the invention.

We claim:

1. A method for displaying a zooming operation on a display screen of a client computing platform, the method comprising:

obtaining a collection of data for displaying map images of geographic features;

using said data to display on the display screen a first image showing geographic features at a first scale with a first level of detail and then to display on the display screen a second image showing the same geographic features at a second scale with a second level of detail, wherein the second scale is different from the first scale; and between the displaying of the first image and the displaying of the second image, displaying on the display screen an intermediate image that combines two component images showing at least some of the same geographic features, wherein the two component images in the intermediate image arm at the same scale, wherein the two component images in the intermediate image are registered so that the same geographic features represented in the two component images coincide, and wherein one of the two component images in the intermediate image includes at least a portion of the first image and is formed using data from a first layer of a geographic database and the other of the two component images in the intermediate image is formed using data from a second layer of the geographic database.

2. The method of claim 1 wherein at least one of the two component images in the intermediate image is displayed at a less than full color saturation.

3. The method of claim 1 wherein the second image is formed using data from the second layer of the geographic database.

4. The method of claim 1 wherein the one of the two component images in the intermediate image gradually fades out.

5. The method of claim 1 wherein the other of the two component images in the intermediate image gradually fades in.

6. The method of claim 1 wherein at least some geographic features represented by the first image are displayed differently in the second image.

7. The method of claim 1 wherein the scale used for the intermediate image corresponds to the first scale.

8. The method of claim 1 wherein the scale used for the intermediate image corresponds to the second scale.

9. The method of claim 1 further comprising the steps of:
obtaining geographic data from the first layer of the geographic database to display the first image; and
obtaining geographic data from the second layer of the geographic database to display the intermediate image.

10. The method of claim 1 wherein at least one of the two component images in the intermediate image is displayed with transparency.

11. The method of claim 1 wherein the first image and the second image are displayed using the Scalable Vector Graphics standard.

12. The method of claim 1 wherein the first image and the second image are displayed in an Internet browser.

13. The method of claim 1 wherein the computing platform is a vehicle navigation system.

14. The method of claim 1 wherein the step of obtaining comprises downloading the collection of data from a server.

15. A method of providing context while zooming a map display on a client computing platform, the method comprising:

obtaining data from a first layer of a geographic database to represent geographic features at a first scale in a first image;

displaying said first image on the display screen;

using data from a second layer of the geographic database to represent at least some of the geographic features at a second scale in a second image, wherein the second scale is different from the first scale;

displaying said second image on the display screen after displaying said first image;

combining data from at least two separate layers of the geographic database to represent at least some of the geographic features in a third image, wherein the two separate layers include at least one of the first layer and the second layer, and wherein the third image is separate from the first image and the second image;

displaying said third image on the display screen after displaying said first image and before displaying the second image.

16. The method of claim 15 further comprising:

prior to the step of using data from the first layer of the geographic database to represent geographic features at the first scale in the first image, downloading the data used to represent the geographic features in the first image, the second image and the third image from a server.

17. A method of providing context while zooming a map display on a client computing platform, the method comprising:

obtaining data from a first layer of a geographic database located on a server to represent geographic features at a first scale in a first image;

displaying said first image on the display screen;

using data from a second layer of the geographic database located on the server to represent at least some of the geographic features at a second scale in a second image, wherein the second scale is different from the first scale;

displaying said second image on the display screen after displaying said first image;

combining data from at least two separate layers of the geographic database to represent at least some of the geographic features in a third image, wherein the two separate layers include at least one of the first layer and the second layer;

displaying said third image on the display screen after displaying said first image and before displaying the second image prior to the step of using data from the first layer of the geographic database to represent geographic features at the first scale in the first image, downloading the data used to represent the geographic features in the first image, the second image and the third image from the server; and downloading a routine from the server that adjusts layer transparency depending upon zoom layer.

18. A method of presenting a map on a display screen of a client computing platform, comprising the steps of:

sending a request from the client computing platform to a server for map data;

on the client computing platform, receiving map data from the server, wherein the map data includes data from at least two separate layers, wherein each of said layers represents geographic features at a different level of detail;

using the map data from one of said layers to present on a display screen of the client computing platform a first map image that represents geographic features in a first geographic area;

initiating a zooming operation on the client computing platform; and presenting an intermediate image on the display screen of the client computing platform, wherein the intermediate image includes at least a portion of the first map image and also includes a second map image of the same geographic features shown in the portion of the first map image using data from another of said layers, wherein tile same geographic features shown by the first map image and the second map image in the intermediate image coincide.

19. The method of claim 18 wherein the step of presenting is performed by an SVG viewer.

20. The method of claim 18 further comprising:

on the client computing platform, receiving a routine from the server along with the map data, wherein the routine is used to adjust layer transparency depending upon zoom layer.

21. The method of claim 18 wherein the first map represents geographic features located along a calculated route.

22. A method of presenting a map on a display screen of a client computing platform, comprising the steps of:

sending a request from the client computing platform to a server for map data;

on the client computing platform, receiving map data from the server, wherein the map data includes data from at least two separate layers, wherein each of said layers represents geographic features at a different level of detail;

using the map data from one of said layers to present on a display screen of the client computing platform a first map image that represents geographic features in a first geographic area;

initiating a zooming operation on the client computing platform; and presenting an intermediate image on the display screen of the client computing platform, wherein the intermediate image includes at least a portion of the first map image and also includes a second map image of the same geographic features shown in the portion of the first map image using data from another of said layers, wherein the same geographic features shown by the first map image and the second map in the intermediate image coincide;

after presenting the intermediate image, presenting an ending image on the display screen of the client computing platform, wherein the ending image includes at least a portion of the same geographic features shown in the first map image but at a different scale and wherein the ending image is formed using data from a layer other than the layer used for forming the first map image.

23. A method of zooming a map on a computer display comprising:

obtaining map data;

using said map data for displaying representations of geographic features on a display screen at a first scale with a first level of detail;

displaying representations of at least some of the same geographic features on the display screen at a second scale with a second level of detail, wherein the second scale is different from the first scale and the second level of detail is different from the first level of detail; and displaying an intermediate image after the displaying of the representations of the geographic features at the first scale and before the displaying of at least some of the same geographic features at the second scale, wherein the intermediate image is separate from said representation at the first scale and said representation at the second scale, wherein the intermediate image overlays representations of at least some of the geographic features at two different levels of detail, wherein the two different levels of detail include one of:

the first level of detail and the second level of detail, the first level of detail and a level of detail between the first level of detail and the second level of detail, and the second level of detail and a level of detail between the first level of detail and the second level of detail.

24. The method of claim 23 wherein the step of obtaining comprises obtaining said map data from a server.

* * * * *